United States Patent
Byrd et al.

[15] 3,659,744
[45] May 2, 1972

[54] PROCESS AND APPARATUS FOR DISPENSING AND FILLING CONTAINERS

[72] Inventors: Carl Byrd, Chicago; Martin Mueller, Glenview, both of Ill.

[73] Assignee: Owens-Illinois, Inc.

[22] Filed: May 18, 1970

[21] Appl. No.: 38,245

[52] U.S. Cl. .................................. 221/1, 221/211, 221/221, 221/236, 221/251
[51] Int. Cl. ........................................................ B65g 59/00
[58] Field of Search .................................. 221/210-216, 221, 221/236, 238, 1, 298, 251, 289-293, 224, 225

[56] References Cited

UNITED STATES PATENTS 1,866,369  7/1932  Podel ................................. 221/238 X Primary Examiner—Samuel F. Coleman
Attorney—Dressler, Goldsmith, Clement & Gordon

[57] ABSTRACT

A method and apparatus for dispensing containers, and filling the containers with a liquid or semi-solid food product. The container dispensing assembly is adapted to simultaneously dispense the lowermost container from a plurality of stacks of containers in a magazine assembly; and to insure positive dislodgment of the lowermost containers, a stripping plate is positioned above the lowermost containers during the container dispensing step, while lifting plates simultaneously move the containers remaining in the stacks upwardly to positively separate the lowermost containers from the remaining containers. The apparatus includes a conveyor for moving the containers to a filling station, and a suction actuated carrier means positively transports the dispensed lowermost containers to the conveyor and deposits them in a row thereon. A positive displacement piston type pumping means is provided at the container filling station for discharging product into each container in the row, and each pumping means includes a shiftable spool type valve for accurately controlling the amount of product that is dispensed into each container. The pumping means each include a product dispensing nozzle, and the spool valve is arranged to create a suction on each nozzle during movement of each row of containers to the filling station to prevent dripping and wastage of product. The volumetric output of the pumping means is accurately controlled by a means for adjusting the length of the stroke of the piston means.

19 Claims, 17 Drawing Figures

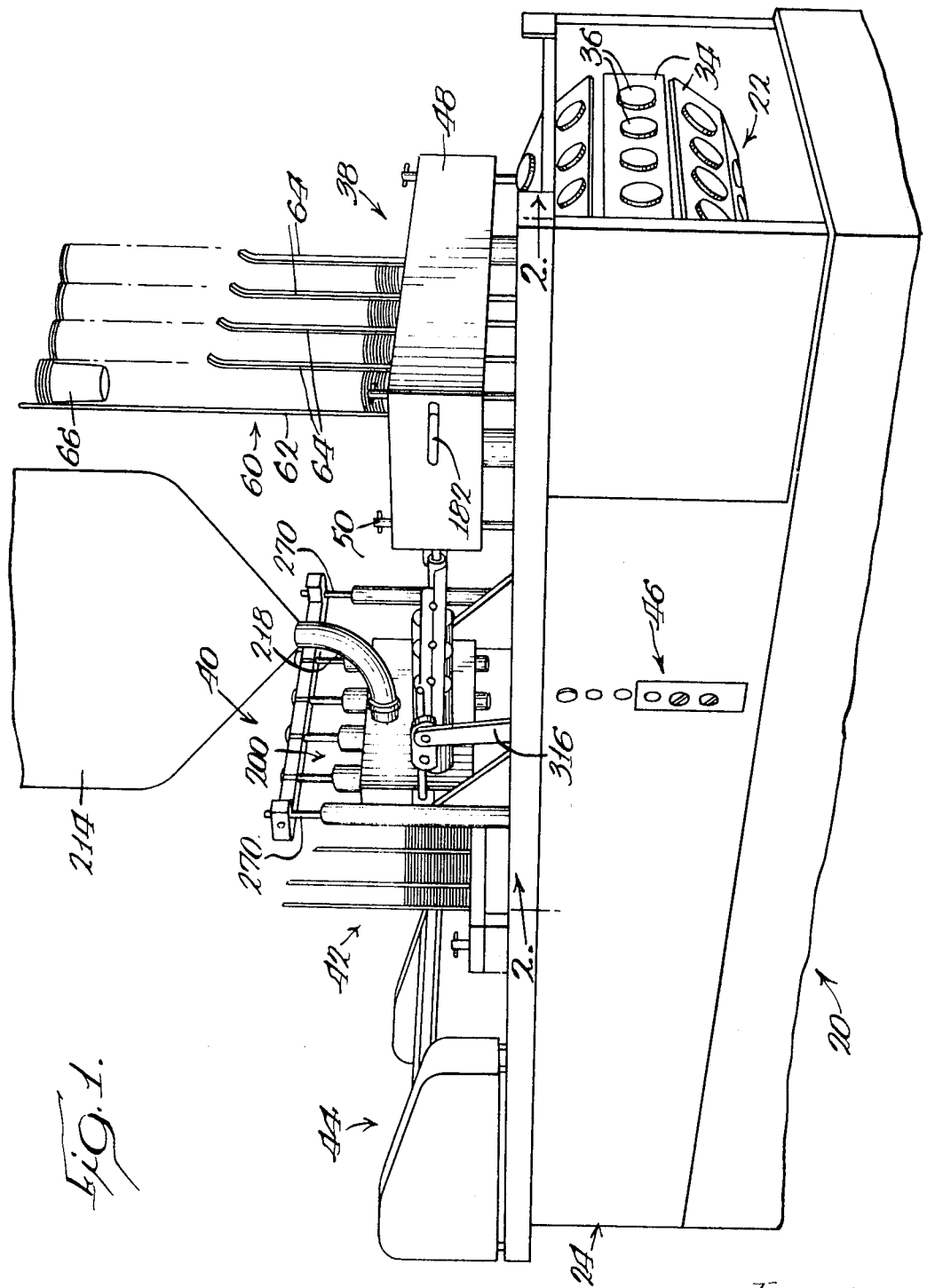

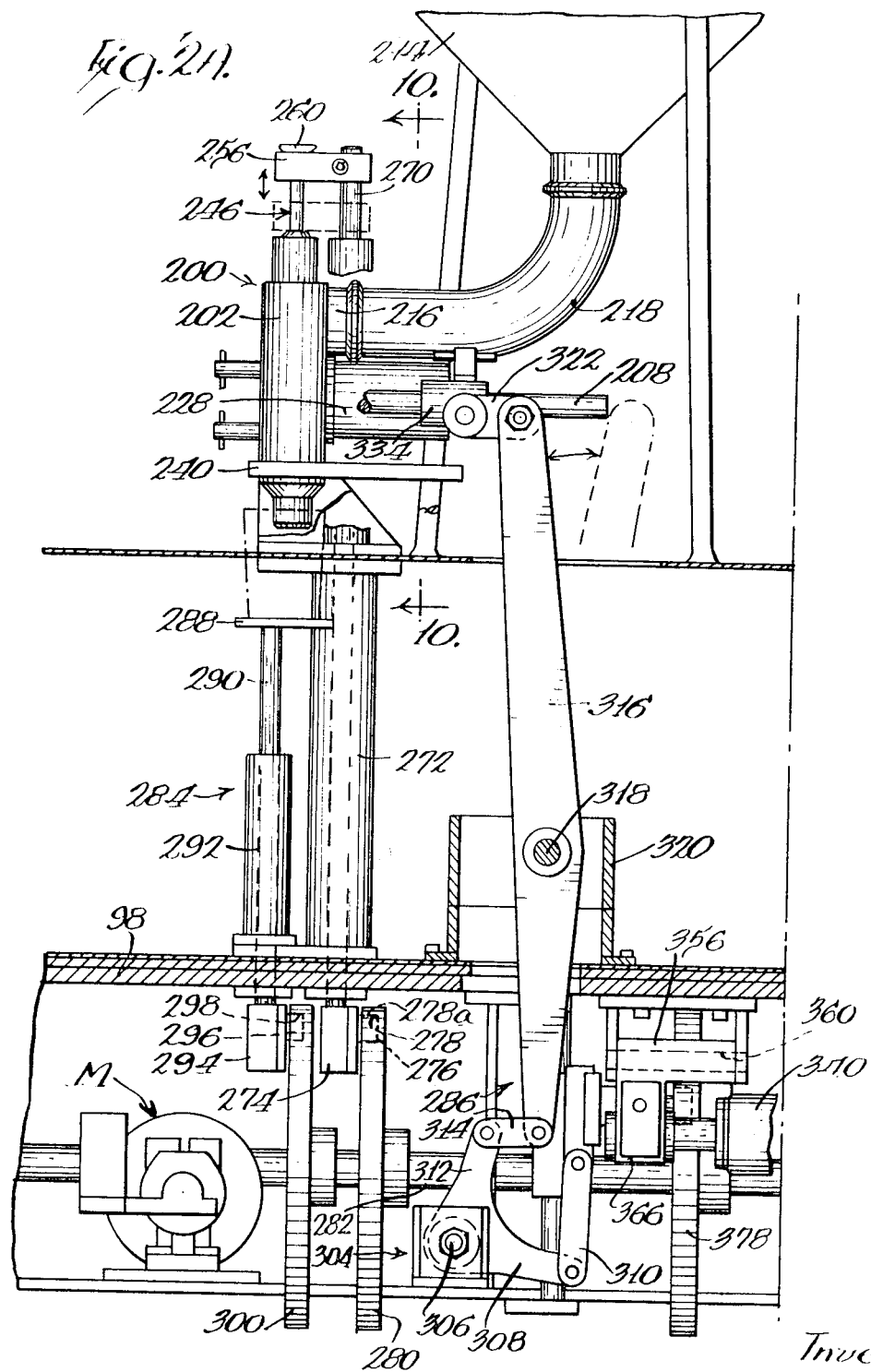

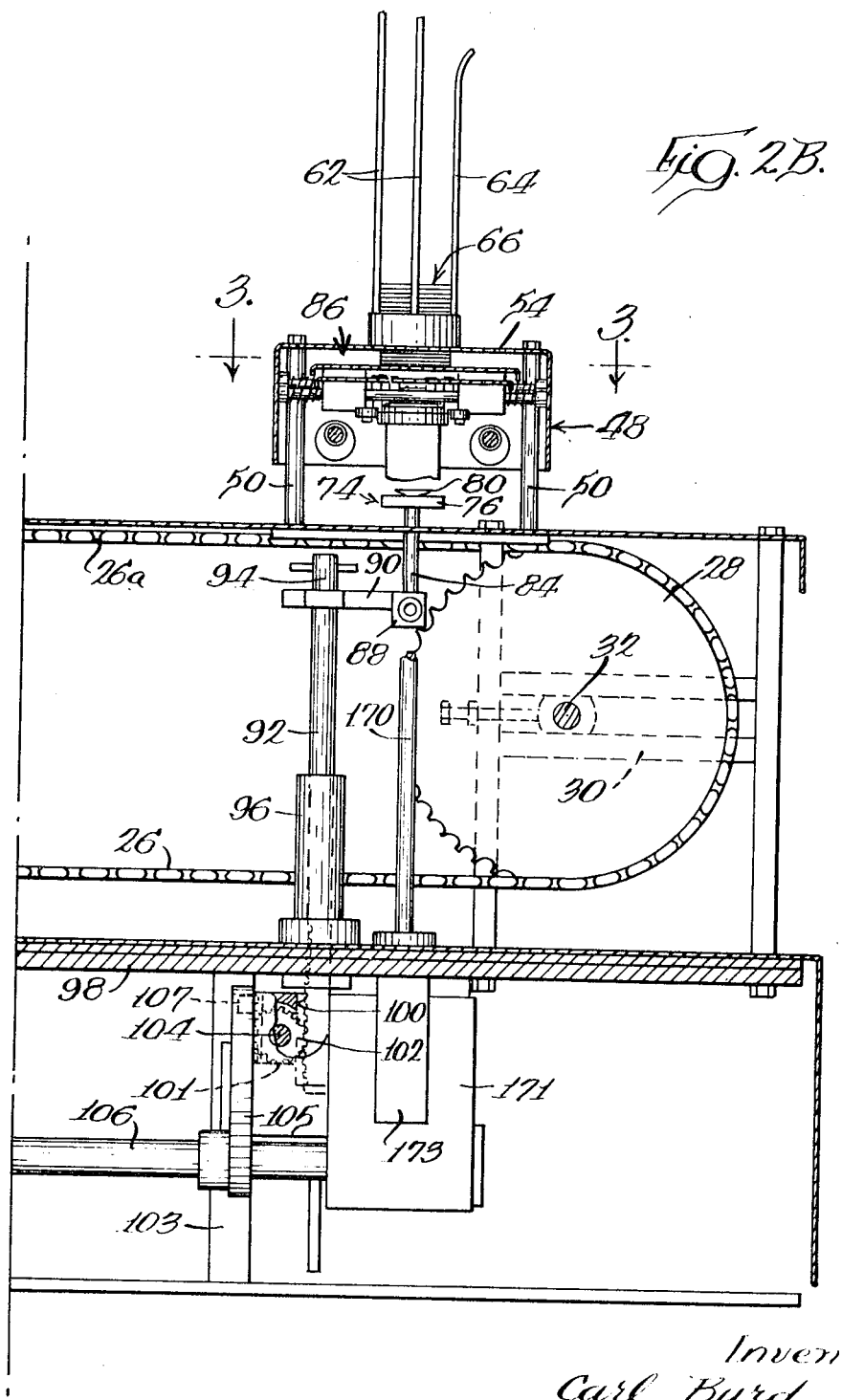

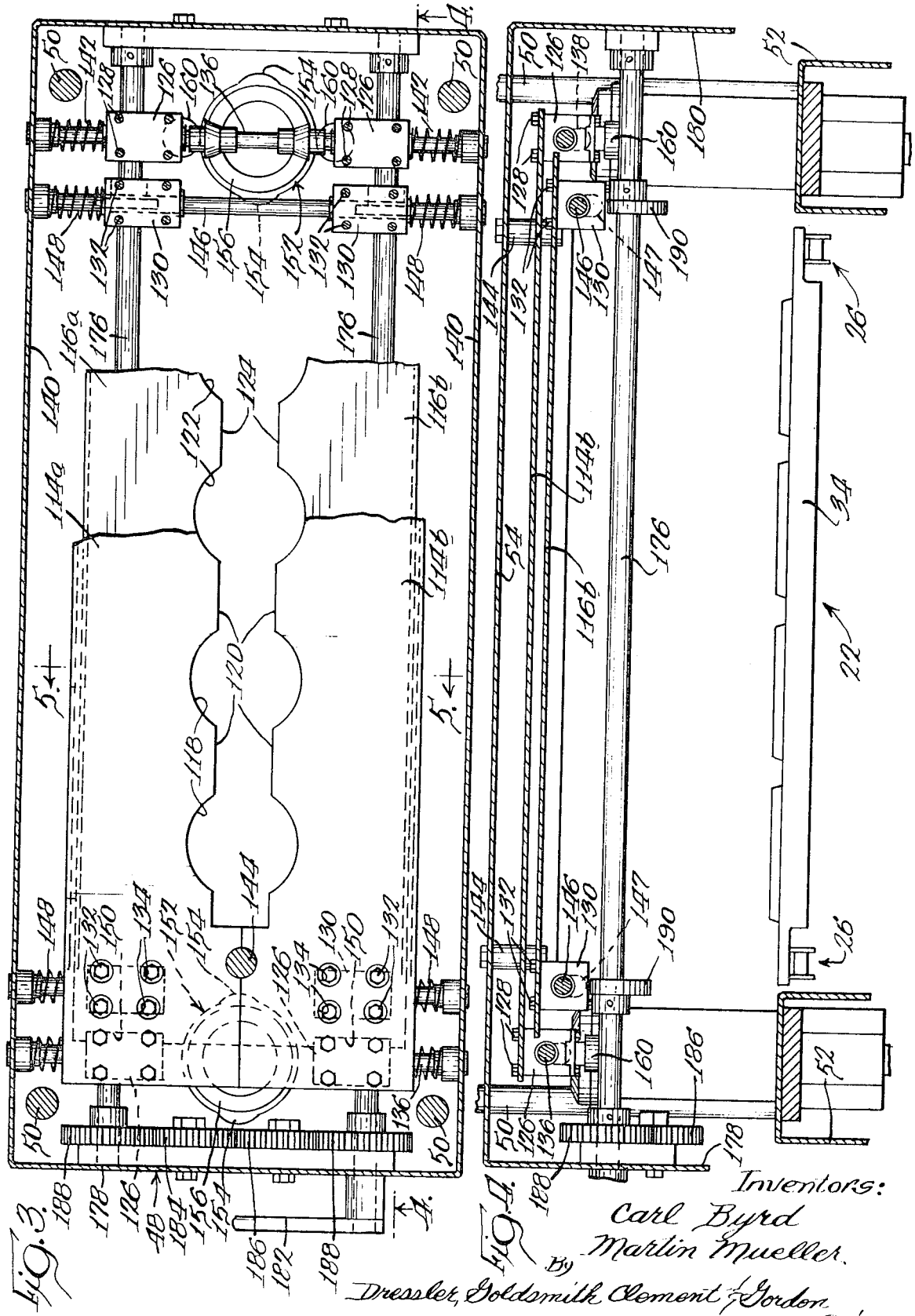

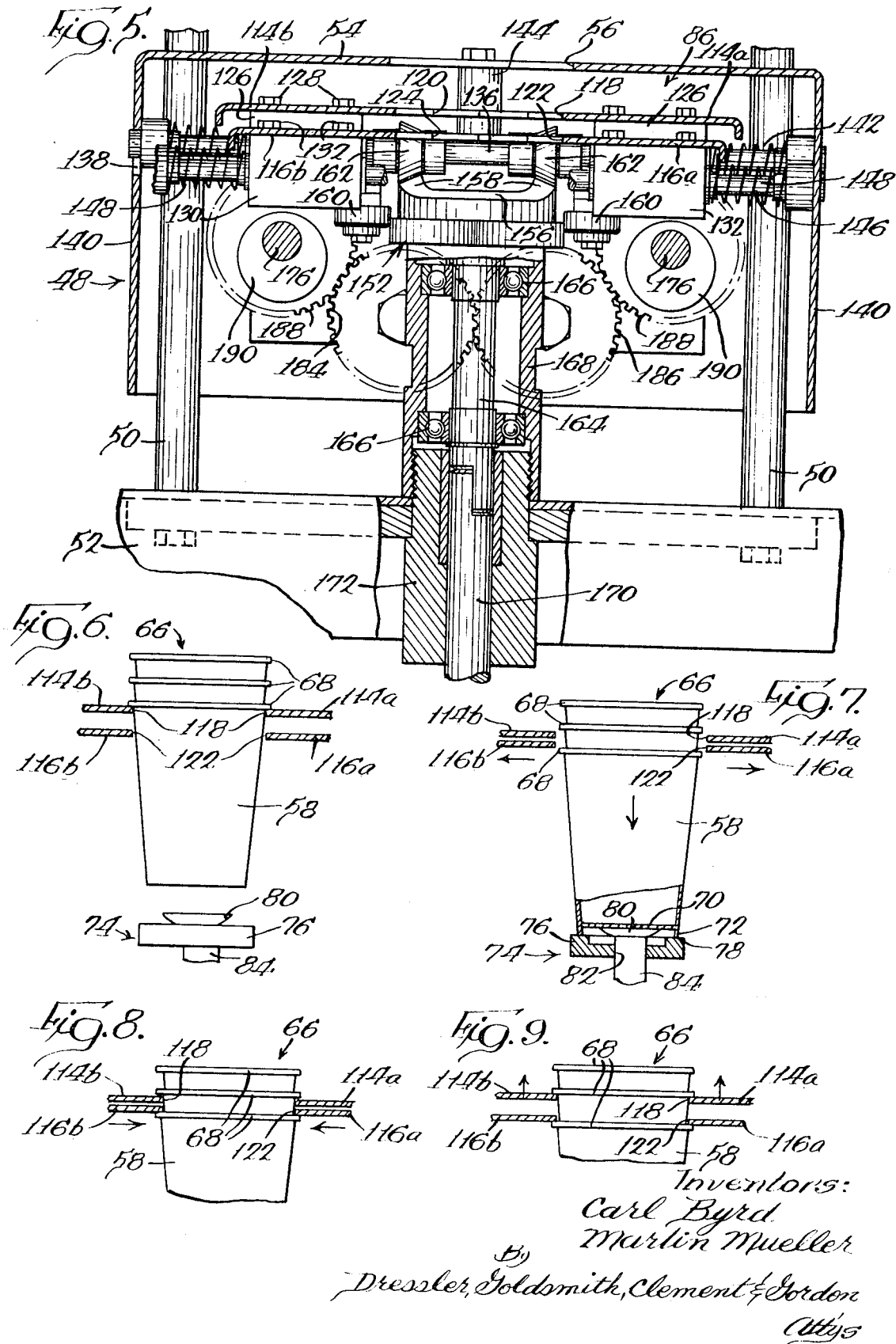

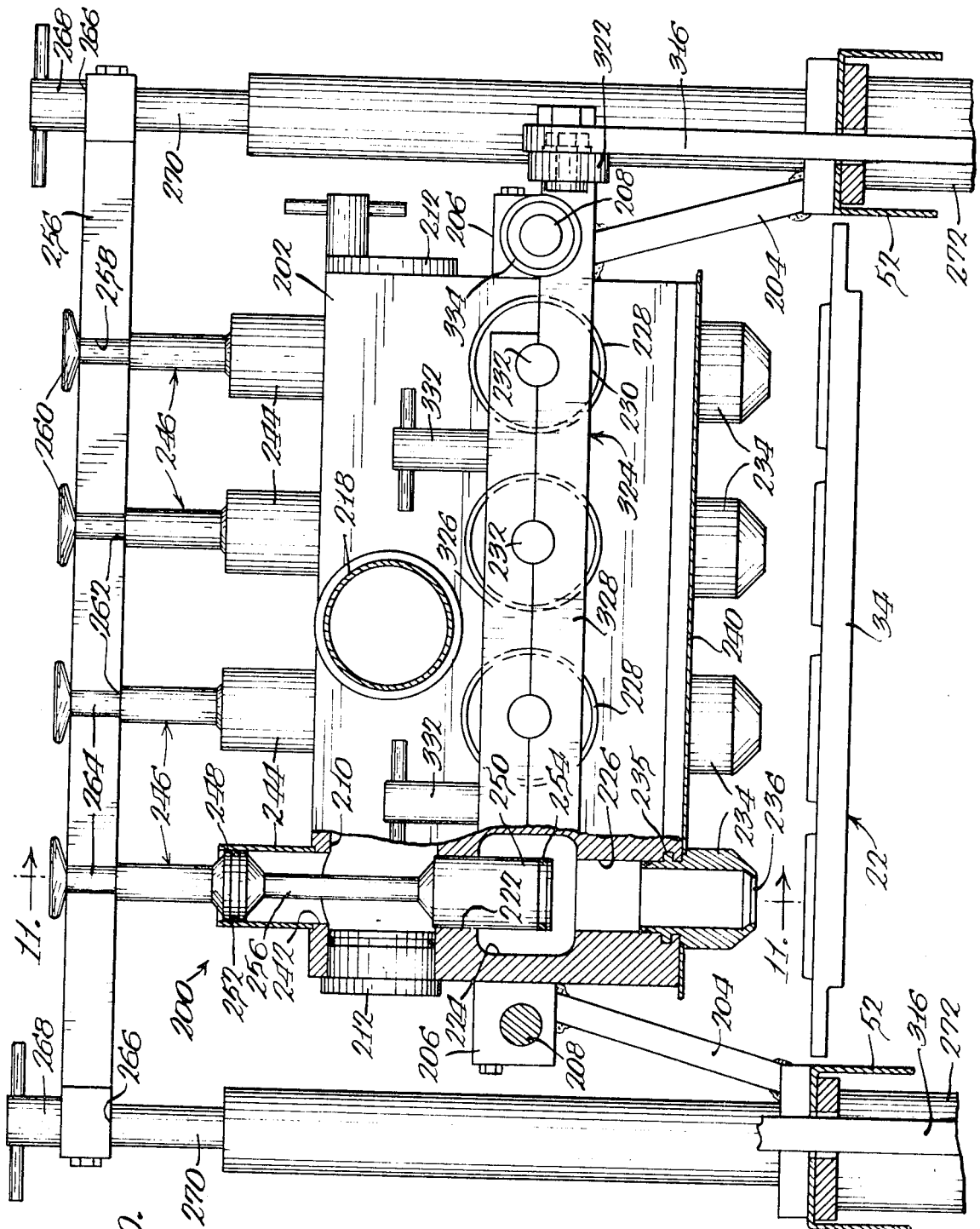

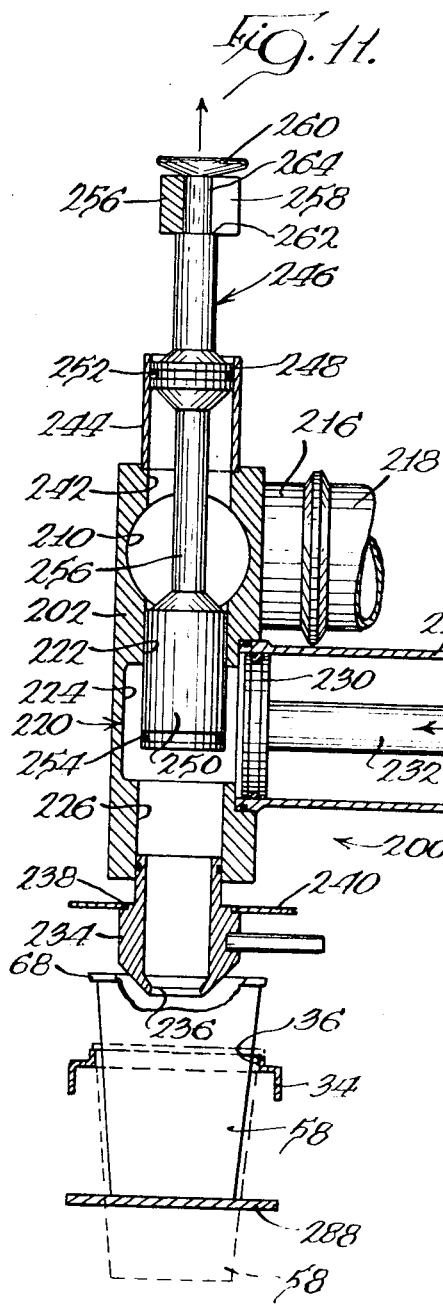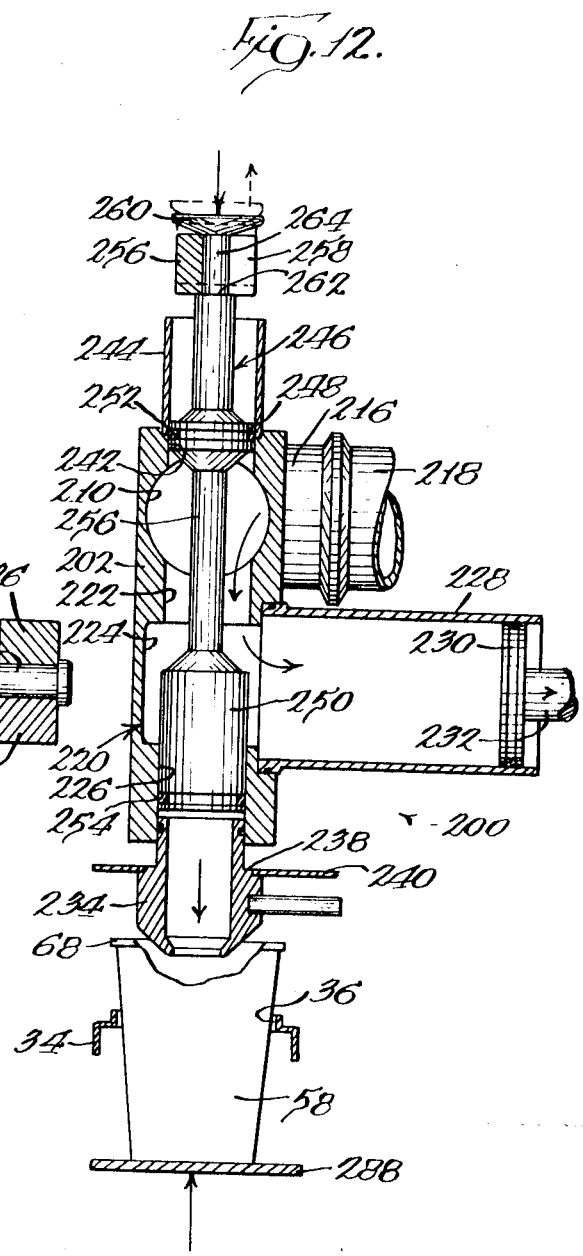

Patented May 2, 1972

Inventors:
Carl Byrd
Marlin Mueller
By Dressler, Goldsmith, Clement & Gordon
Attys

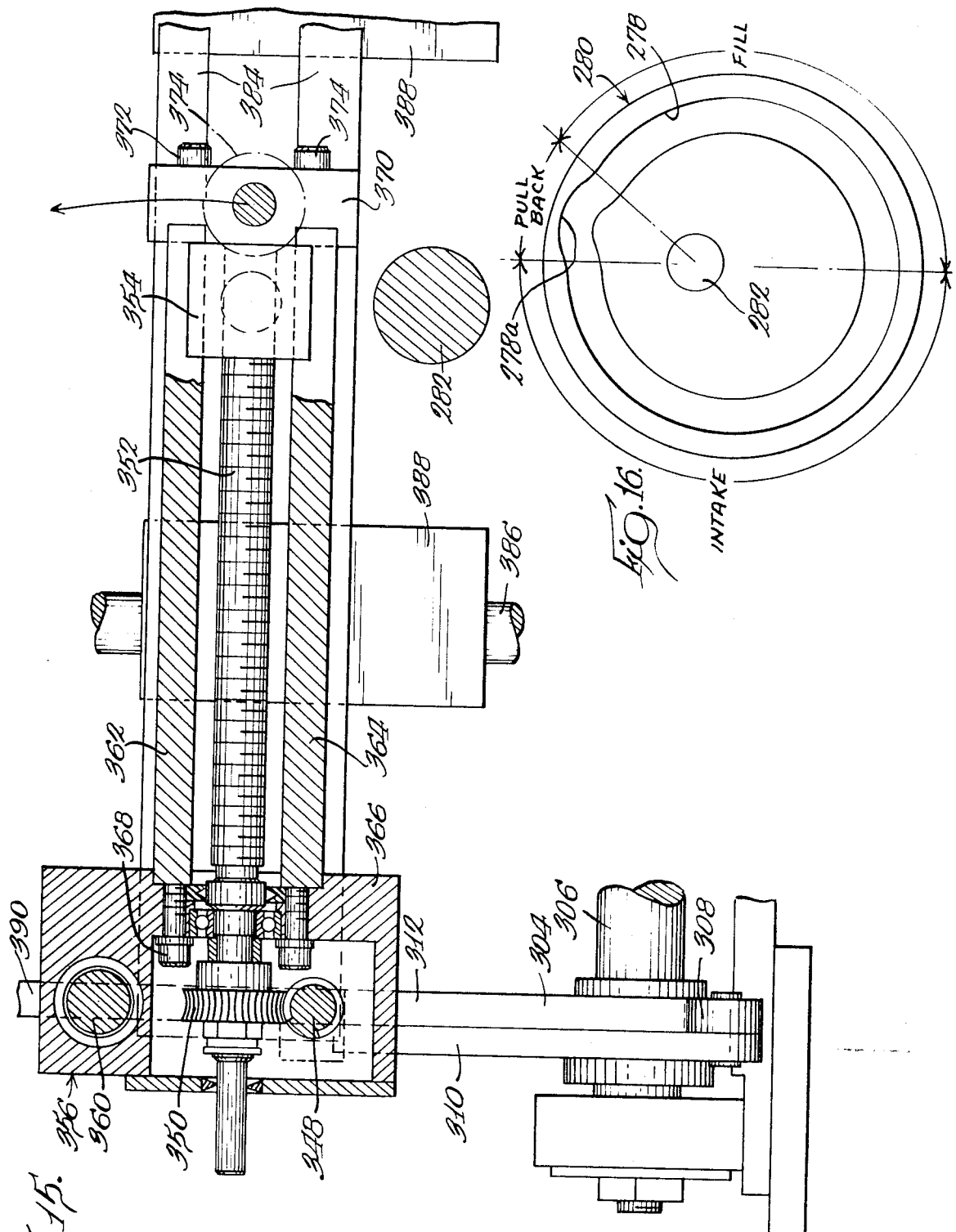

PROCESS AND APPARATUS FOR DISPENSING AND FILLING CONTAINERS

BACKGROUND OF THE INVENTION

In the past, many problems have arisen in providing high speed, multiple line packaging equipment in the food processing industry. The stringent sanitary conditions that must be maintained in the area of food packaging equipment has in the past required that the equipment be operated at relatively slow speeds to prevent spillage and wastage of product and to insure that accurate quantities of product are metered into each product container.

The process and apparatus of the present invention have particular utility in the packaging of a semi-fluid dairy product; such as, for example, yogurt, cottage cheese and sour cream, although it will be appreciated from the ensuing detailed description that the process and apparatus of the present invention have general utility in the packaging of other fluid and semi-fluid food products. Semi-fluid food products such as those mentioned above are conventionally packaged in wax coated paper or plastic containers of various sizes. Such containers are usually generally frusto-conically shaped, and are transported to a dairy in a carton containing a plurality of stacks of containers nested within one another. In the past, it has been common to provide some form of container dispensing mechanism for automatically dispensing the lowermost container from the stack of containers onto a conveyor for transport to a filling station. However, the container dispensing mechanisms that have been used in the past have not consistently and accurately deposited the lowermost container on the conveyor; and instead, it has been found that the lowermost container will often remain associated with the stack of containers due to tightness, melted wax, etc. In an automated apparatus, it will be appreciated that if the container dispensing mechanism fails to dispense a container to the conveyor, the filling mechanism will still operate to dispense product, which in the absence of a container will not only result in wastage of product, but also in the creation of unsanitary conditions.

A still further problem that is prevalent in the semi-fluid food packaging art is the difficulty of providing a product filling mechanism that will accurately meter a selected quantity of product into the container without splashing the spillage of the product, and without dripping when containers are being moved into and out of product filling relationship with respect to the filling means. The problem of drippage from the container filling means is very severe in the packaging of a semi-fluid dairy product of the type mentioned above.

SUMMARY OF THE INVENTION

The present invention provides a novel container dispensing mechanism and product pumping mechanism which cooperate to produce a high speed multiple line packaging arrangement for semi-fluid food products. The container dispensing assembly guarantees continuous operation of the machine, by providing an arrangement where the lowermost containers are simultaneously stripped from a plurality of stacks of nested containers in a magazine assembly. The stripping action is provided by positioning a blocking plate above the lowermost container in each stack of containers during a container dispensing step, and lifting the remaining containers in the stacks to positively dislodge the lowermost container therefrom. During the stack lifting step, the lowermost container of each stack is supported upon a platform member, and vacuum is applied to the lowermost container to positively retain the same of the platform means. The platform means is subsequently lowered to positively transport and accurately position the lowermost containers on a conveyor, which moves the containers to a filling station.

At the filling station, the containers are raised upwardly to position the upper end thereof above the lower end of a product dispensing nozzle, so that even splashless filling can be effected. The filling mechanism associated with each product dispensing nozzle is a positive displacement piston pump that is controlled by a spool valve. The spool valves insure that a precise volume of product will be pumped into each container, and the spool valves are arranged to create a suction on the nozzles after the containers have been filled, to prevent drippage from the nozzles when a further group of containers are moved into position at the filling station.

BRIEF DESCRIPTION OF THE SEVERAL VIEWS OF THE DRAWINGS

FIG. 1 is a perspective view of the apparatus of the present invention;

FIG. 2A is a partial sectional view taken generally along line 2—2 of FIG. 1, and illustrates the structure at the filling station of the apparatus.

FIG. 2B is a partial sectional view taken generally along line 2—2 of FIG. 1, and illustrates the structure at the container dispensing station;

FIG. 3 is a sectional view taken generally along line 3—3 of FIG. 2B;

FIG. 4 is a sectional view taken generally along line 4—4 of FIG. 3;

FIG. 5 is a sectional view taken generally along line 5—5 of FIG. 3;

FIGS. 6–9 are schematic sectional views illustrating in step-by-step sequence the mechanism for stripping the lowermost container from the stacks of containers;

FIG. 10 is an enlarged elevational view taken generally along line 10—10 of FIG. 2A, with certain portions of the pumping mechanism being shown in section;

FIG. 11 is a sectional view taken generally along line 11—11 of FIG. 10 with the valve spool being illustrated in a raised position;

FIG. 12 is a sectional view similar to FIG. 11 but with the valve spool in a lowered position;

FIG. 15 is a sectional view taken generally along line 15—15 of FIG. 14; and

FIG. 16 is a detailed view of the valve spool controlling cam.

DETAILED DESCRIPTION

Figure 13:
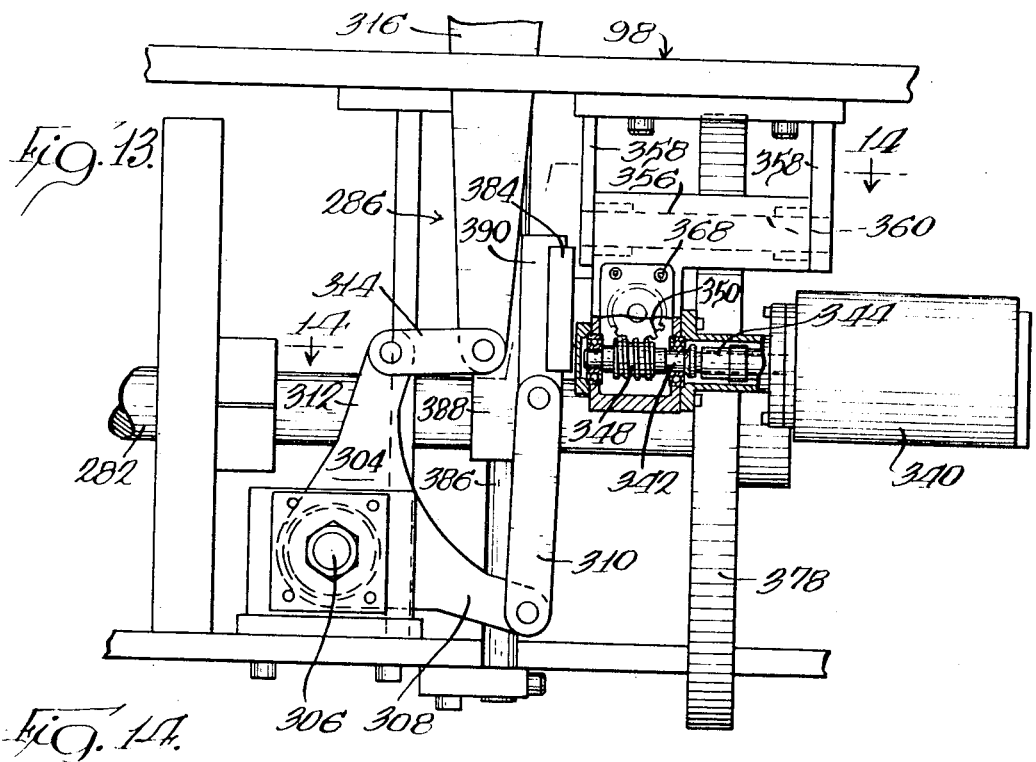
FIG. 13 is an enlarged fragmentary side elevational view of the valve spool actuating mechanism.

Referring now to the drawings in detail, the apparatus of the present invention is illustrated in its entirety at 20 in FIG. 1, and apparatus 20 includes an endless container-moving conveyor 22 that is positioned within a suitable housing 24. Conveyor 22 includes a pair of endless chains 26 (FIG. 2B) at opposite sides of the housing 24 that are trained over sprockets 28 at opposite ends of the machine. Sprockets 28 are rotatably supported upon frame structure 30 by transverse shafts 32, and the conveyor 22 is intermittently driven by conventional means, such as a drive motor and Geneva drive mechanism (not shown).

Each chain 26 includes a horizontally disposed reach portion 26a (FIG. 2B) that is disposed adjacent the upper end of housing 24, and a plurality of cup holding plates 34 (FIG. 1) are secured to the laterally spaced chains 26. Each plate 34 includes a plurality of laterally spaced side-by-side openings 36 for reception of a container dispensed from a magazine assembly 38, as will hereinafter appear. The plates 34 are preferably removably mounted upon the chains 26, as by having snap fit members on the chains engage openings in the plates, so that the plates 34 can be easily replaced with other plates having different sized openings when different size containers are to be dispensed from the magazine assembly 38. While plates 34 have been illustrated as including four openings 36, it will be appreciated that a greater or lesser number of openings may be provided, as desired.

After a row of containers has been dispensed onto the conveyor 22, the containers are transported to a filling station 40 where a suitable volume of product is pumped into each container, as will hereinafter appear. The filled containers are subsequently transported to a lidding station 42, where lids are applied to each container by a conventional shuttle type lidding mechanism. The filled and lidded containers are then transported to a take away station 44, where the filled containers are pushed out of the cup holding plates 34 and pushed onto a further conveyor (not shown) for further handling. A control panel 46 (FIG. 1) is provided at a centrally disposed location on the housing 24 so that a single operator can observe the various functions of the apparatus and operate appropriate controls, when necessary. All of the functions of the machine, i.e., the conveyor drive, the container dispensing, the container filling, the container lidding and the container push out mechanism are operated from a synchronized drive system so that all of the interrelated functions are correlated and operated in the proper timed sequence.

The container dispensing mechanism 38 will be best understood from a consideration of FIGS. 2B and 3–9. The container dispensing assembly 38 includes a housing 48 that is supported above housing 24 by vertical tie rods 50 that are secured to spaced side frame members 52 of the machine 20, and to the top wall 54 of the housing 48. Clearance openings 56 (FIG. 5) are provided in the upper wall 54 of housing 48 to allow containers 58 to move from a storage area 60 above the housing 48 to the conveyor 22. The container storage area 60 is defined by generally vertically extending rods 62 and 64, which cooperate to slidably support a stack 66 of containers therebetween, it being understood that each stack 66 is positioned in alignment with an opening 36 in a container holding plate 34 on conveyor 22.

While the dispensing mechanism 38 of the present invention has utility with containers having various shapes, the containers 58 illustrated herein, as best seen in FIGS. 6–9, are generally frusto-conically shaped to facilitate slidable inter-nesting of the containers. The containers 58 each include an enlargement at the upper end thereof in the form of an outwardly extending circumferentially continuous bead 68. The bottom 70 (FIG. 7) of each container is spaced upwardly from the lower end of the side wall thereof, so that a skirt 72 is provided at the lower end of each container.

The container dispenser assembly includes means 74 for receiving the ejected lowermost containers and for positively transferring the containers to the conveyor 22. The container transfer assembly 74 includes a plurality of side-by-side platform members 76, each having an upraised circular flange 78 adapted to be positioned in supporting engagement with the circular skirt 72 at the end of each container 58. A suction cup 80 extends upwardly through a central opening 82 in each platform member 76, with each suction cup 80 being adapted to be positioned in retentive engagement with the bottom 70 of each container 58. The suction cups 80 each include a vertical stem 84 that is connected to a suitable source of negative pressure, not shown.

The container transfer mechanisms 74 are positioned for vertical movement relative to a container ejector mechanism 86 within housing 48, and to this end, stems 84 are each connected to a transversely extending mounting bar 88 (FIG. 2B). Arms 90 extend outwardly from bar 88, and are secured to the upper ends of vertically movable shift rods 92 by clamp members 94. Shift rods 92 are mounted for vertical movement within guide sleeves 96 that are fixed to horizontally disposed frame members 98, and shift rods 92 have a rack tooth configuration 100 (FIG. 2B) adjacent the lower end thereof. A pinion 102 is carried by a cam follower member 101, and pinion 102 is positioned in meshing engagement with the teeth of rack 100, and with the teeth (not shown) of a fixed rack 103. A cam 105 is mounted for rotation with a shaft 106, and cam 105 includes an internal cam slot receiving a cam follower 107 on member 101 therewithin. Thus, as cam 105 is rotated by shaft 106, member 101 is moved up and down while the rotation imparted to pinion 102 by rack 103 causes lift rods 92 to move up and down. It will be understood that shaft 106 is driven in timed relationship with respect to the drive to ejector mechanism 86 to move upwardly into engagement with an ejected container (FIG. 7), and then to move downwardly through the openings 36 in the container holding plates 34 of the conveyor 22. A sequencing valve, not shown, is connected to the stems 84 of suction cups 80 to break the suction as the containers 58 approach the holding plates 34, so that the containers are positively deposited on the conveyor.

The ejector mechanism 86 is defined essentially by a first pair of generally horizontally disposed, coplanar upper plates 114a and 114b, and a second pair of generally horizontally disposed coplanar, lower plates 116a and 116b. Plates 114a and 114b include a cutout configuration adjacent their mating edges defined by spaced arcuate portions 118 connected by linear portions 120. In a like manner, the adjacent edges of plates 116a and 116b include a plurality of arcuate portions 122 aligned with arcuate portions 118 and connected by linear portions 124 aligned with linear portions 120. As will hereinafter be explained in detail, the cutout portions of plates 114a and 114b are shaped to conform to the portion of containers 58 to immediately below enlargements 68 to provide a releasable support for the stacks 66 (FIG. 6), and to provide a stack lifting function (FIG. 9). The cutout portions of lower plates 116a and 116b are also shaped to conform to the configuration of containers 58 below enlargements 68 to provide a stripping action (FIG. 9) for the lowermost container in each stack 66.

Plates 114a and 114b and plates 116a and 116b are spring biased toward one another to a position where the respective cutout portions 118, 120, 122 and 124 are positioned in confronting relationship with one another. To this end, guide blocks 126 are secured by fasteners 128 to the underside plates 114a and 114b adjacent the outer ends thereof, while guide blocks 130 are secured by fasteners 132 to the underside of plates 116a and 116b adjacent the outer ends thereof. Fasteners 132 are accessible for tightening and adjustment through clearance openings 134 in top plates 114a and 114b. A shaft 136 extends through aligned bores in the mounting blocks 126 at each end of plates 114a and 114b, with shafts 136 serving to guide the plates 114a and 114b for movement in a horizontal plane toward and away from one another. The outer ends of shafts 136 are slidably positioned in vertical slots 138 in the side walls 140 of housing 48, so that the plates 114a and 114b are capable of vertical movement, as will also be explained hereinafter. Springs 142 are positioned between enlarged portions of shafts 136 adjacent walls 140 and guide blocks 126 to urge the plates 114a and 114b toward one another, where the edges of the plates 114a and 114b outwardly of the central cutout portions are positioned in engagement with one another.

Shafts 146 are slidably positioned in aligned bores in the mounting blocks 130 at each end of lower plates 116a and 116b to mount the plates 116a and 116b for movement in a horizontal plane toward and away from one another. The outer ends of shafts 146 are mounted in vertical slots 147 in walls 140 of housing 48, so that the plates 116a and 116b are capable of limited vertical movement. Springs 148 surround shafts 146 and are positioned between mounting blocks 130 and enlargements at the outer ends of shafts 146 adjacent walls 140 to bias the plates 116a and 116b toward one another to position the edges of the plates outwardly of the central cutout portions in engagement with one another.

The present invention includes means allowing plates 114a and 114b and 116a and 116b to move in and out simultaneously, and in the illustrated embodiment, notches 150 are provided in each end of plates 116a and 116b, with blocks 126 being disposed in notches 150 to key the plates 116a and 116b to plates 114a and 114b. There is sufficient clearance between notches 150 and blocks 126 to allow the upper plates 114a and 114b to move vertically relative to the lower plates 116a and 116b, as will hereinafter appear.

The means for effecting relative movement between plates 114a and 114b and 116a and 116b includes a compound cam 152 adjacent each end of the plates, with cam 152 including a pair of diametrically opposed outwardly extending lobes 154 as well as a vertical cam profile 156 including diametrically opposed upwardly extending lobes 158. Cam followers 160 are secured to guide blocks 126 and extend downwardly therefrom into position to be engaged by cam lobes 154 to simultaneously move plates 114a and 114b and 116a and 116b outwardly relative to one another. Cam followers 162 are positioned at spaced locations on shafts 136 for engagement with cam lobes 158 (FIG. 5) for vertical movement of upper plates 114a and 114b relative to lower plates 116a and 116b. Guide rods 114 are secured to the upper portion 54 of housing 48 and are seated within notched portions of upper plates 114a and 114b outwardly of the central cutout portions to guide the plates 114a and 114b in their vertical movement.

Cams 152 are fixed to the upper ends of vertically extending cam shafts 164 that are rotatably mounted by vertically spaced bearings 166 in a bearing retainer 168. Cam shafts 164 are keyed to vertical drive shafts 170, which are rotatably mounted in guide sleeves 172 fixed to frame members 52, and shafts 170 are driven in timed relationship with respect to the drive to conveyor 22 and to the container transport assemblies 74, so that the dispensing and movement of the containers 58 is synchronized with the intermittent drive of the conveyor 22. The rotary input to shafts 170 is from shaft 106, which initially is converted into transverse rotary movement by a transmission within gear box 171. The output from gear box 171 is converted into vertical rotary motion by transmissions within gear boxes 173 at opposite sides of the machine, and the rotary output from gear boxes 173 is connected to drive shafts 170.

In use, during movement of the conveyor to position a container holding plate 34 in vertical alignment with the stacks 66 of containers 58, springs 142 and 148 bias the plates 114a and 114b and 116a and 116b toward one another, with the upper plates 114a and 114b engaging beneath the projection 68 at the upper end of the lowermost container in each stack to support the stacks of containers. When the conveyor comes to rest with the openings 36 in a container holding member 34 in vertical alignment with the stacks 66 of containers 58, cam shafts 164 are rotated by drive shafts 170 to move lobes 158 out of engagement with cams 162 so that the stacks 66 of containers will drop downwardly from the position of FIG. 6 to the position of FIG. 7. At the same time, lobes 154 move outwardly into engagement with cam followers 160 to move the plates 114a and 116a and 114b and 116b outwardly relative to one another to a celarance position illustrated in FIG. 7 wherein the peripheral surfaces 118, 120, 122 and 124 of the plates are spaced outwardly from the container stacks 66. Simultaneously with the latter movement, pinion 104 is rotated in a counterclockwise direction (as viewed in FIG. 2B), and rods 92 move the container transport assemblies 74 upwardly to a position where the platforms 76 engage the lowermost containers in each stack 66. It will be understood that when the plates 114a and 114b and 116a and 116b move to the position of FIG. 7, each stack 66 will drop downwardly into position on the platforms 76, and the suction cups 80 engage the lowermost portion 70 of each container to positively retain each of the lowermost containers on its respective transport assembly.

As cam shafts 164 continue to rotate, lobes 154 move out of engagement with cam followers 160, and springs 142 and 148 move plates 114a and 116a and plates 114b and 116b inwardly relative to one another to the position illustrated in FIG. 8, where the cutout portions on the uppermost plates 114a and 114b are positioned below the bead 68 at the upper end of the second lowermost container, while the cutout portions on the lower plates 116a and 116b are positioned above the upper periphery of the lowermost container 58. As cam shafts 164 continue to rotate, lobes 158 again move into engagement with cam followers 162, and the upper plates 114a and 114b are moved upwardly relative to the lower plates 116a and 116b. During this latter movement, each of the stacks 66 is lifted upwardly, while the lowermost plates 116a and 116b positively strip the lowermost containers in each stack from the remaining containers, thereby overcoming any stickiness due to tightness, melted wax, etc.

As cam 105 continues to rotate, pinion 102 is rotated in a clockwise direction to move the transport assemblies 74 downwardly through the openings 36 in the container holding plate 34 at the container dispensing station with the suction cups 80 serving to positively retain the ejected containers and transport them into position on the conveyor. The negative pressure to suction cups 80 is broken as the containers approach the conveyor 22, so that there will be no difficulty in transferring support of the containers from the transport assemblies to the conveyor. When the ejected containers are positioned on the conveyor 22 with the peripheral beads 68 engaging the peripheral surface around openings 36, the conveyor 22 is again actuated and the above sequence is repeated.

A manually actuable blocking assembly is provided for discontinuing feeding of containers during start up and shut down, or during other periods when containers are not required. To this end, transversely extending shafts 176 are rotatably mounted in the end walls 178 and 180 of housing 48, with a manually accessible handle 182 being rotatably mounted in housing wall 178 and connected to one of shafts 176. A pair of gears 184 and 186 are rotatably mounted on housing wall 178 and are positioned in meshing engagement with one another, with gear 184 being positioned in meshing engagement with a gear 188 on one shaft 176, and with gear 186 being positioned in meshing engagement with a gear 188 on the other shaft 176. Eccentric blocking cams 190 are secured to each shaft 176 vertically below each guide block 130 and cams 190 are normally spaced from blocks 130, as shown in the drawings, to allow the container ejector mechanism to function in the above described manner. However, when it is desired to prevent the feeding of containers, as during start up or shut down, handle 182 is pivoted to rotate one shaft 176, while the other shaft 176 is also rotated through gears 184, 186 and 188 to bring the cams 190 into engagement with the lower surface of blocks 130 to shift the plates 114a and 114b vertically upwardly into engagement with plates 116a and 116b, thereby preventing the dispensing of containers. The throw of cams 190 is sufficient that plates 114a and 114b shift plates 116a and 116b upwardly a sufficient distance that followers 160 and 162 are spaced above cam lobes 154 and 158. To resume normal operation, it is merely necessary to pivot the operating handle 182 back to the position illustrated in the drawings, and the lowermost containers from the stacks 66 will again be sequentially deposited upon the conveyor 22.

A positive displacement pumping mechanism 200 is provided at the filling station 40 for accurately discharging measured amounts of product into the containers 58 positioned at the filling station. The pumping means will be best understood from a consideration of FIGS. 2A and 10–12. The pumping mechanism 200 includes a valve body 202 that extends transversely across the frame of the machine 20, and the valve body 202 is secured in fixed relationship relative to the conveyor 22 by supports 204 (FIG. 10) that are secured, as by welding, to frame members 52 and to lugs 206 that extend outwardly from opposite sides of the valve body 202. Horizontally disposed guide rods 208 are fixed in bores in lugs 206, and function to control the movement of a piston actuating assembly, as will hereinafter be described.

The valve body 202 includes a horizontally disposed chamber 210 at the upper end thereof which is sealed at both ends by plugs 212, with chamber 210 defining an inlet manifold that communicates with a product source 214 through an inlet conduit 216 and an elbow 218.

Valve body 202 includes a plurality of identical vertically disposed valve chambers 220 therewithin, each valve chamber 220 including cylindrical intermediate and lower portions 222 and 226, respectively, of equal diameter, and an intermediate portion 224 of enlarged diameter. The cylindrical portion 222 of each chamber 220 is positioned in communication with chamber 210, while the enlarged portion 224 of each valve chamber communicates with one end of an open ended cylinder member 228 that is secured in sealed relationship within a recess in one side wall of the valve body 202. A piston 230 is positioned in sealed relationship with respect to the inner wall of each cylinder 228, and a rod 232 is connected to each piston 230 for reciprocating each piston 230 inwardly and outwardly relative to its respective chamber portion 224.

A nozzle 234 is held in sealed relationship with respect to the lower end of each chamber portion 226 by diametrically opposed bayonet portions 235 that cooperate with right angled slots (not shown) in nozzles 234. Each nozzle 234 has a convergent outlet orifice 236 at the lower end thereof for discharging product into the container 58 positioned therebelow. Nozzles 234 each include a horizontally disposed shoulder 238, and shoulders 238 cooperate to provide a surface that supports a drip tray 240 that receives and retains any spillage or leakage from the pump assembly.

Each valve chamber 220 further includes an upper chamber portion 242 positioned in axial alignment with chamber portions 222, 224 and 226. An axially open extension sleeve 242 is fixed in a counterbore at the upper end of each chamber portion 242 with the inner diameter of sleeve 242 cooperating with the wall of cylindrical chamber portion 242 to define an effectively continuous chamber surface having the same diameter as chamber portions 222 and 226.

A control valve spool 246 is mounted for vertical sliding movement in each valve chamber 220, and spools 246 include spaced, generally cylindrically shaped land areas 248 and 250. An O-ring 252 is seated within a circumferential recess in land area 248, and is positioned in sealing engagement with respect to the effectively continuous wall defined by chamber portion 242 and sleeve 244. An O-ring 254 is positioned in a circumferentially continuous groove adjacent the lower end of land area 250, and is positioned in sealing engagement with respect to chamber portion 226 when the valve spool 246 is moved into a product intake position (FIG. 12). A reduced diameter portion 256 is provided on valve spool 246 between land areas 248 and 250 for allowing product to freely flow into the upper end of chamber 220 when the control valve spool 246 is in the upper position (FIG. 11) and for allowing fluid to flow freely into the cylinder 228 when the control valve spool 246 is in the lower position (FIG. 12).

The means for moving the valve spools 246 within chambers 220 includes a transversely extending connector bar 256 having a plurality of vertical recesses 258 in one side thereof, there being a recess 258 for each control valve spool 246. Bar 256 is confined between an enlarged head 260 at the upper end of each valve spool and a shoulder 262 positioned therebelow, a reduced diameter portion 264 of each spool 246 being received within a recess 258. The outermost ends of bar 256 are held against shoulders 266 on vertical lift rods 270 by clamping members 268, and lift rods 270 are mounted for vertical sliding movement within guide tubes 272 that are secured to frame member 98. A cam follower block 274 (FIG. 2A) is fixed to the lower end of one lift rod 270 below frame member 98, and a cam follower 276 on block 274 is positioned within an internal cam 278 of a cam member 280 that is fixed to shaft 282. Internal cam 278 has a continuous cam track for raising and lowering the lift rods 270, and the cam track has an offset portion 278a for causing a pull back of valve spools 246 when they are in the lowered position, the purpose of which will hereinafter appear. Shaft 282 is rotated in timed relationship with respect to a container elevating mechanism 284 and a piston actuating mechanism 286 to coordinate movement of the control valve spools 246 with the raising of the containers 58 into material receiving position and with the movement of the pistons 230.

The container elevator assembly 284 is adapted to lift the containers 58 below nozzles 234 from a normal transport position illustrated in FIG. 11 to a raised position illustrated in FIG. 12 wherein the discharge end 236 of each nozzle 234 is positioned inwardly of the upper end of a container 58. To this end, a transversely extending platform 288 is positioned beneath nozzles 234, and is supported by a pair of guide rods 290 at opposite sides of the machine, which are slidably received in guide sleeves 292 that are fixed to frame member 98. A cam block 294 is fixed to the lower end of guide rods 290, and a cam 296 extends outwardly from cam block 294 into an internal cam slot 298 in a cam member 300 that is mounted for rotation with shaft 282.

The piston actuating mechanism 286 includes a bell crank 304 (FIG. 2A) pivotally mounted on a transverse shaft 306, with bell crank 304 including a first arm 308 having its end portion pivotally connected to a driving link 310. Bell crank 304 includes a second arm 312, one end of which is pivotally secured to a connecting link 314 and the other end of which is pivotally connected to a generally vertically extending actuating arm 316. The midportion of actuating arm 316 is pivotally connected at 318 to a frame member 320 that is mounted on frame member 98, and the upper end of arm 316 is pivotally connected to one end of a motion transmitting link 322, the opposite end of which is connected to a piston rod engaging member 324. As can be best seen in FIG. 10, member 324 is defined by an upper section 326 and a lower section 328 that are held in clamping engagement with a reduced diameter portion 330 of each piston rod 232 by clamping members 332. Sleeves 334 are fixed to piston rod engaging member 324 adjacent the outer ends thereof, and slidably embrace shafts 208 to guide the member 324 during its movement. Thus, when bell crank 304 is pivoted in a counterclockwise direction by link 310, arm 316 is pivoted in a clockwise direction about pivot 318 by link 314, and the upper end of arm 316 moves into the broken line position shown in FIG. 2A to move the pistons 230 outwardly of cylinders 228. Similarly, when bell crank 304 is pivoted in a clockwise direction by link 310, arm 316 is pivoted in a counterclockwise direction above pivot 318 by link 314 and the upper portion of arm 316 moves from the broken line to the full line position of FIG. 2A to move the pistons 230 inwardly of cylinders 228.

Figure 14:
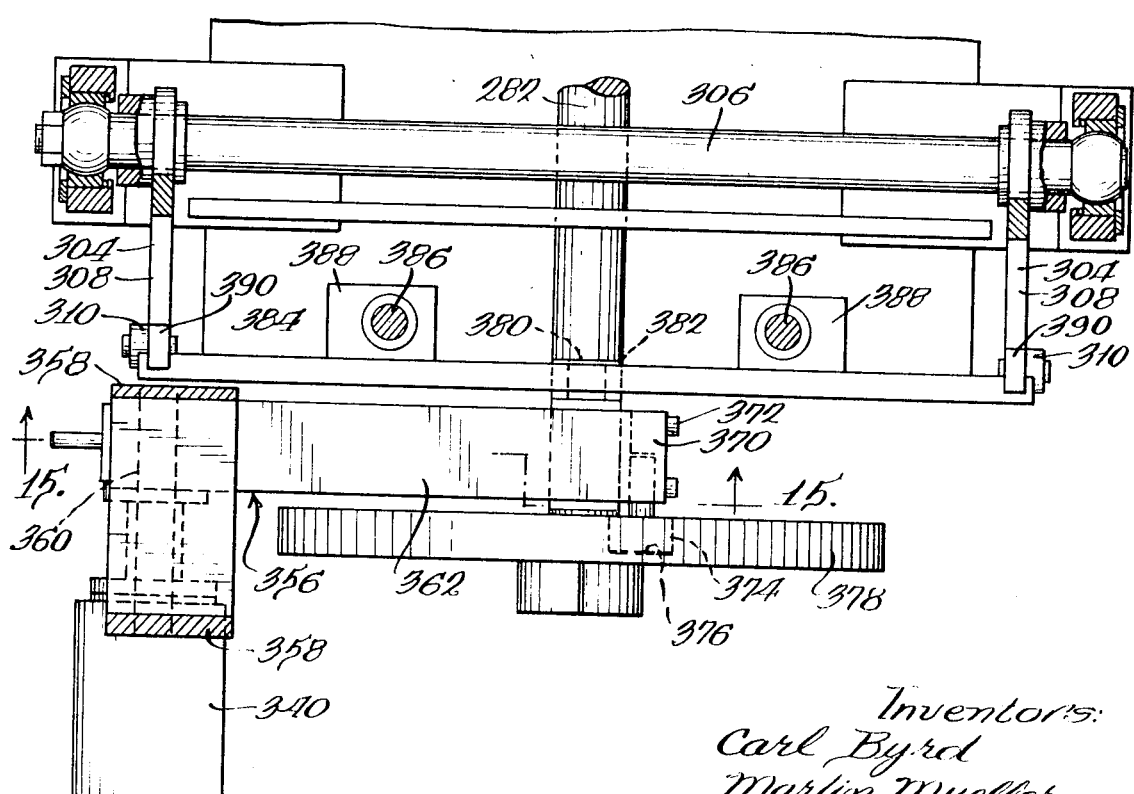
FIG. 14 is a sectional view taken generally along line 14—14 of FIG. 13.

The present invention includes means for adjusting the stroke of pistons 230 to thereby vary the amount of product that is discharged into the containers at the filling station, and said means will be best understood from a consideration of FIGS. 13–15. As can be best seen in FIG. 13, an adjusting motor 340 is suspended from frame member 98, and the output shaft 342 of motor 340 is connected by a coupling 344 to a further shaft 346 having a worm gear 348 thereon. Worm gear 348 is positioned in meshing engagement with a worm wheel 350 fixed on an externally threaded transversely extending shaft 352 (FIG. 15), and an internally threaded adjusting block 354 is mounted on shaft 352 for movement therealong. Motor 340 is a reversible motor, and it will be understood that when motor 340 is energized, the position of block 354 on shaft 352 can be varied and controlled.

A housing 356 (FIG. 13) is mounted for pivotal movement about a shaft 360 between a pair of plates 358 that are secured in depending relationship with respect to frame member 98. A pair of transversely extending spaced plates 362 and 364 (FIG. 15) are secured to a front wall 366 of housing 356 by fasteners 368, and a follower mounting block 370 is secured to the opposite ends of plates 362 and 364 by fasteners 372. A cam follower 374 is fixed to block 370, and rides along an internal cam track 376 in a cam 378 (FIG. 14) that is rotated by shaft 282. Thus, as cam 378 rotates, plates 362 and 364 and housing 356 are pivoted through a fixed arc about the axis of shaft 260.

A pin 380 extends rearwardly (as viewed in FIG. 14) from block 354 and fits within a slide block 382 that is positioned within a horizontal slot in a motion transmitting arm 384. Vertical guide rods 386 are fixed to the machine frame, and guide blocks 388 on member 384 slide along rods 386 to confine arm 384 for vertical movement. It will be appreciated that the maximum arc of block 354, and therefore the maximum vertical movement of arm 384, will take place when the block 354 is spaced the maximum distance from pivot 360, as shown in FIG. 14. When motor 340 is energized to move block 354 to the left, as viewed in FIG. 14, the vertical movement imparted to arm 384 will be lessened. Links 390 are connected at the outer ends of member 384, and are pivotally connected to the upper end of links 310. Thus, by varying the position of block 354 by motor 340, the amount of movement that is transmitted to links 310 (and thereby to the pump pistons) can be accurately varied and controlled.

In use, the adjusting motor 340 is energized to position the block 354 at an appropriate position on shaft 352 to locate pin 380 relative to the slot in member 384 in a position that will provide the appropriate volume of product for the particular size containers 58 carried by the conveyor 22. During an intake portion of the filling cycle, arms 316 are pivoted in a clockwise direction, as viewed in FIG. 2A, to move the pistons 230 to the right, as viewed in FIG. 12, as spools 246 are moved downwardly by cams 280 to move O-rings 254 into sealing relationship within chambers 26 and to move reduced diameter portions 256 into chamber portions 224. Valve spool portions 248 act as plungers to force the product within chamber portions 242, sleeves 244 and the portion of passage 210 therebelow into the respective cylinders 228. During the latter portion of the downward movement of spool 256, the product within chamber portions 226 is forced outwardly through nozzles 234 into the containers 58 that have previously been partially filled by the leftward movement of pistons 230. As was previously mentioned, during the entire product discharge portion of the filling cycle, the containers 58 are retained in an elevated position by platform 288. After the appropriate amount of product has been discharged into each container, cam portion 278a moves into engagement with follower 276 and spool 246 is moved slightly upwardly to the broken line position of FIG. 12. This applies a suction to the nozzles 234 while the containers 58 are being lowered by the platform 288 and while subsequent containers are moved to the filling station, thereby preventing product from dripping from the nozzles 234.

After the platform 288 has lowered the filled containers to the conveyor 22, and the conveyor has been indexed to bring a fresh set of empty containers into position at the filling station, cam 280 begins to move spools 246 upwardly, while platform 288 elevates the empty containers 58. As spools 246 move to a position where the land areas 250 move into chamber portions 224, arms 316 are povited in a counterclockwise direction as viewed in FIG. 2A, to move cylinders 230 to the left as viewed in FIGS. 11 and 12 to pump the product contained within cylinders 228 outwardly therefrom, and outwardly of the chambers 220 through nozzles 234.

The rows of filled containers are brought to the lidding station 42, where a closure is applied to each container by a shuttle feeding mechanism, not shown. A coding mechanism, also not shown, may be provided between the lidding station 42 and the take away station 44, if desired, for the application of date, price, product identification and other information to the containers. At the container removal station 44, the filled containers are transferred to a discharge conveyor, not shown, for subsequent packaging and casing.

While this invention is susceptible of embodiment in many different forms, only a preferred embodiment of the invention has been shown in the drawings and described in detail herein. Thus, the present disclosure is to be considered as an exemplification of the principles of the invention and is not intended to limit the invention to the embodiment illustrated. The scope of the invention will be pointed out in the appended claims.

What is claimed is:

1. The method of dispensing containers one at a time from a stack of nested containers comprising: holding the lowermost container in said stack against movement by positioning a holding member above a portion of the lowermost container; positioning a lifting member beneath at least a portion of the second lowermost container in the stack; and lifting the remaining containers in said stack upwardly by moving said lifting member upwardly relative to said lowermost container and relative to said holding member to positively separate the lowermost container from the container adjacent thereto.

2. The method of claim 1 including the step of moving a support element into engagement with the lowermost cup before the remaining containers in said stack are lifted.

3. The method of claim 2 including the step of moving said support element with said container thereon relative to a conveyor, and transferring support of said container from said support element to said conveyor.

4. The method of claim 3 including the step of applying a positive holding force to said container during movement of said support element relative to said conveyor.

5. The method of claim 3 wherein said force applying step is performed by applying a suction to said container.

6. The method of dispensing containers one at a time from a stack of nested containers comprising: moving at least one first support element from a stack supporting position engaging the lowermost container in said stack to a clearance position spaced from said stack; supporting said stack by moving a second support element into engagement with said lowermost container when said first support member is in said clearance position and after the stack moves downwardly a sufficient distance to position said lowermost container below said first support element; moving a holding member into stripping relationship above a portion of said lowermost container; moving said first support element from said clearance position to said stack supporting position and into engagement with the second lowermost container in said stack; and moving said first support element upwardly relative to said holding member and relative to said lowermost container to lift said stack, whereby said holding member strips the lowermost container from the stack.

7. The method of claim 6 in which said containers have a peripheral enlargement, and wherein said first support element is moved beneath the enlargement on said second lowermost container when the first support element moves from the clearance position to the stack supporting position.

8. The method of claim 6 wherein the steps of moving the holding member into stripping relationship above a portion of said lowermost container and moving said first support element from said clearance position to said stack supporting position are performed simultaneously.

9. A magazine assembly for discharging containers one at a time from a stack of nested containers comprising: stack support means; means for moving said support means from a first position supporting said stack to a second position spaced from said stack; means for moving said support means to a position engaging the second lowermost container in said stack; container holding means; means for moving said holding means to a position above the lowermost container to prevent upward movement thereof; and means for moving said support means upwardly relative to said stack while said holding means remains stationary to strip the lowermost container from said stack.

10. A magazine assembly as set forth in claim 9 wherein said stack support means is defined by a pair of coplanar plates, the edges of said plates being positioned in confronting relationship with respect to one another in said first position for engaging beneath an enlargement on the lowermost container to support said stack.

11. A magazine assembly as set forth in claim 10 wherein the means for moving said support means from said first position to said second position includes means for simultaneously moving said plates outwardly relative to one another.

12. A magazine assembly for discharging containers one at a time from a stack of nested containers comprising: stack support means; means for moving said support means from a first position in engagement with the lowermost container in said stack for supporting said stack to a second position spaced from said stack; platform means for supporting said stack when said support means is in said second position; means for moving said support means to a position engaging the second lowermost container in said stack; container holding means positioned below said support means; means for moving said holding means to a position above said lowermost container to prevent upward movement thereof; and means for moving said support means upwardly to lift said stack while said holding means positively separates the lowermost container from the stack.

13. A magazine assembly as set forth in claim 12 wherein said platform assembly includes means for applying a positive retentive force to said lowermost container.

14. A magazine assembly as set forth in claim 13 wherein said force applying means is defined by a suction cup adapted to engage the bottom of said lowermost container.

15. A magazine assembly as set forth in claim 14 including means for moving said platform means for a container pick up position in engagement with said lowermost container to a container release position for transferring support of said container to a conveyor.

16. A magazine assembly for discharging containers one at a time from a stack of nested containers comprising: a first pair of coplanar plates; means for moving said plates outwardly from a first position confronting one another in engagement with the lowermost container in said stack for supporting said stack to a second position spaced from one another and from said stack; a second pair of coplanar plates positioned below said first pair of coplanar plates; means for moving said second pair of plates outwardly from a first position confronting one another to a second position spaced from one another; said first and second pairs of plates being spaced sufficiently from one another in said second positions to allow said stack to move downwardly therebetween; platform means below said second pair of plates and adapted to engage the lowermost container in said stack for supporting said stack when said first and second plates are in said second positions, said platform means being spaced below said second pair of plates by a distance allowing the lowermost container in said stack to drop below said second pair of plates when they are in the second position; means for moving said plates inwardly to a position where the first pair of plates engage the second lowermost container in said stack and the second pair of plates are positioned above the lowermost container in said stack; and means for moving said first pair of plates upwardly to lift said stack while said second pairs of plates remain stationary to strip the lowermost container from the stack.

17. A magazine assembly as set forth in claim 16 wherein each plate of said first pair of plates is connected to the plate therebelow, so that said first and second pairs of plates are coupled for movement simultaneously inwardly and outwardly.

18. A magazine assembly as set forth in claim 17 wherein the connection between the plates of said first and second pairs is provided by cooperating key and keyway means.

19. A magazine assembly as set forth in claim 16 including means guiding the plates of said first pair for movement in a first horizontal plane and means guiding the plates of said second pair for movement in a second horizontal plate below said first plane.

* * * * *

UNITED STATES PATENT OFFICE
CERTIFICATE OF CORRECTION

Patent No. 3,659,744                              Dated May 2, 1972.

Inventor(s) CARL BYRD and MARTIN MUELLER

It is certified that error appears in the above-identified patent and that said Letters Patent are hereby corrected as shown below:

Under the heading UNITED STATES PATENTS, the following patents, which were cited by the Examiner, were not listed on the patent:

| | | | |
|---|---|---|---|
| 1,849,148 | 3/1932 | Mojonnier | 221/236X |
| 2,954,900 | 10/1960 | Brubaker | 221/211 |
| 3,419,186 | 12/1968 | Cease | 221/221 |
| 3,420,407 | 11/1969 | Cristine et al. | 221/221 |
| 3,492,785 | 2/1970 | Mancini | 221/221X |

Column 1, line 44, after "splashing" change "the" to read -- and --.

Column 1, line 68, "of" should read -- on --.

Column 5, line 14, "114" should read -- 144 --.

Column 11, claim 15, line 2, "for", second occurrence, should read -- from --.

Signed and sealed this 3rd day of October 1972.

(SEAL)
Attest:

EDWARD M. FLETCHER, JR.
Attesting Officer

ROBERT GOTTSCHALK
Commissioner of Patents